Jan. 5, 1965  D. L. ST. CLAIR  3,163,973
CUP SEALING APPARATUS
Filed April 9, 1962  4 Sheets-Sheet 1
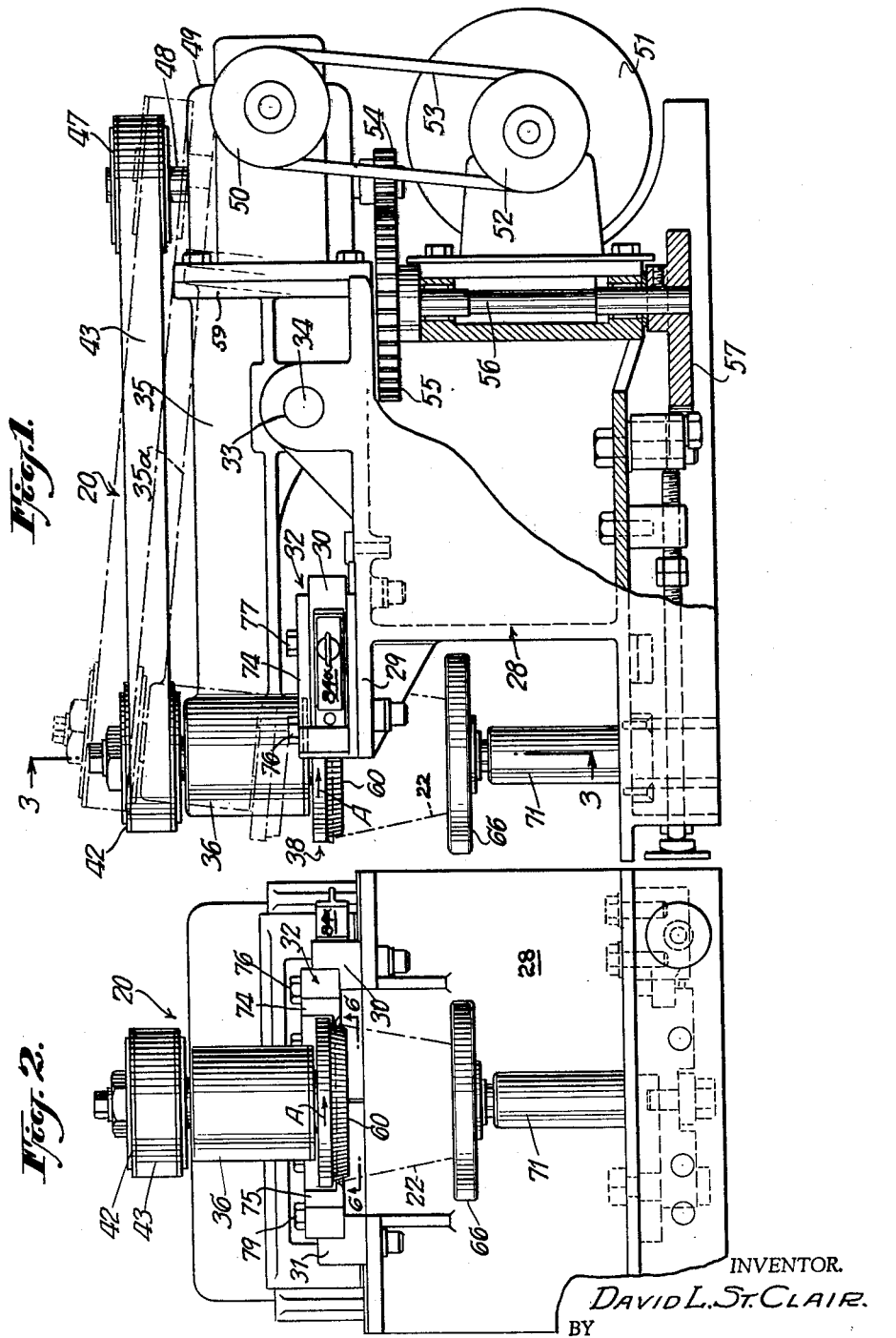
INVENTOR.
DAVID L. ST. CLAIR.
BY
Ward, Neal, Haselton, Orme & McElhannon
ATTORNEYS.

INVENTOR.
DAVID L. ST. CLAIR.
BY
Ward, Neal, Haselton, Orme & McElhannon
ATTORNEY.

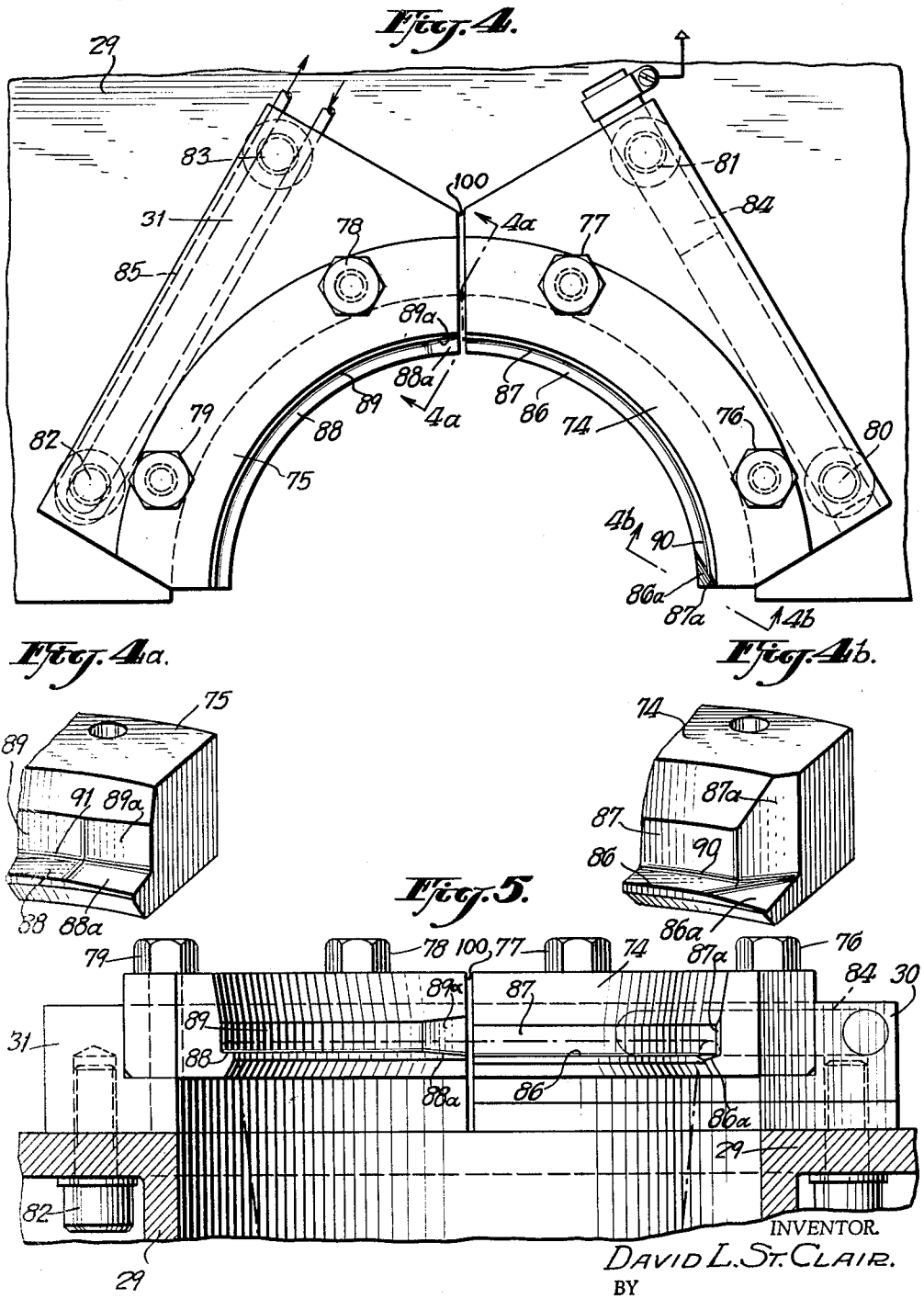

Jan. 5, 1965  D. L. ST. CLAIR  3,163,973
CUP SEALING APPARATUS
Filed April 9, 1962  4 Sheets-Sheet 4

INVENTOR.
DAVID L. ST. CLAIR
BY
Ward, Neal, Haselton, Orme & McElhannon
ATTORNEYS.

United States Patent Office 3,163,973
Patented Jan. 5, 1965

3,163,973
CUP SEALING APPARATUS
David L. St. Clair, Commack, N.Y., assignor to Lily-Tulip Cup Corporation, New York, N.Y., a corporation of Delaware
Filed Apr. 9, 1962, Ser. No. 186,142
11 Claims. (Cl. 53—329)

This invention relates to the sealing of caps on to receptacles or the like. More particularly, the invention relates to a method and apparatus for forming a very effective mechanical seal between a cap and the open end of the receptacle which the cap is intended to cover.

While the invention has been found to be highly successful in applications where the cap is made of polystyrene material and the receptacle material is wax-coated stiff paper, and will therefore be described in connection with such combination of materials, it is contemplated that the invention will also be found useful in instances where the cap is of other plastic material, such as polyethylene, etc., or of wax-coated, or even plain paper material, and where the receptacle is made of any of such plastics or even of plain paper, no reason now being apparent why the inventive method and apparatus would not be applicable in instances where any combination of such materials might be so employed.

In the packaging of many products, particularly those of liquid or semi-liquid consistency, there is an increasing tendency to use generally cylindrical or frustro-conical shaped receptacles of wax-coated stiff paper material which are then capped to form an enclosed container for the goods. While the art of manufacturing such receptacles has advanced sufficiently so that the seams and joints thereof are made satisfactorily leak-proof at least with regard to the packaging of certain products, difficulty has been experienced in finding satisfactory techniques for mechanically sealing the caps on to the filled receptacles in a manner such that an acceptable leak-proof seal is formed.

Various conventional techniques found in the paper container art, and various techniques adapted from the metal container art have been tried, but none have appeared to be satisfactory for the purpose, for one reason or another. For example, the mechanical seals which have been found effective when sealing metal caps on to metal receptacles are either not economically formed when working with paper, or are too permanent in nature to be effectively employed in sealing a cap which is intended to be manually removable by the consumer. Capping seals as are known in the paper art usually involve the application of a sealant such as wax or adhesive between the cap and the receptacle for the reason that simple mechanical seals, as formed by friction locking or the like, either are inadequate or involve the employment of a relatively complicated bend pattern and the use of commensurately complicated sealing apparatus as well as multiple steps in forming such mechanical seals.

In addition, while polystyrene plastic material is for several reasons desirably employed as a cap for such paper receptacles, it has been found that even those sealing techniques which are at least somewhat acceptable for forming paper-to-paper mechanical seals have not been satisfactory in instances where the cap is formed of such plastic material. For example, where even a complicated bend pattern has been found to form an adequately leak-proof seal between a paper cap and a paper receptacle, the additional apparatus or the additional steps as are necessary to form the same bend pattern on the same paper receptacle appears to become unduly complex or expensive where the cap is made of such plastic.

By the present invention, a highly effective method and apparatus is provided for crimping and locking caps of plastic material on to receptacles which are made of wax-coated paper, thereby forming a mechanical seal therebetween. Moreover, and as previously noted, it appears that the method and apparatus may also be fully effective in similarly crimping and locking either plastic or paper caps on to either paper or plastic containers. Thus, whereas prior methods and apparatus for mechnically sealing paper caps on paper receptacles appear to be not well-suited for sealing plastic caps on to the same containers, it is believed that the present invention incorporates a degree of universality of application in this regard as is not found in the prior art. It becomes apparent that the number of different and specialized types of equipment required in a modern capping plant will be to that extent reduced by the present invention.

It is another object of the invention to provide a method and apparatus of the type which is relatively uncomplicated in principle so that the equipment incorporating the same will not be unduly complex. Initial costs of construction and subsequent maintenance costs, as well as the chances for operational breakdown, will thereby be reduced.

It is still another object of the invention to provide such a sealing apparatus wherein it is only necessary to introduce capped receptacles and subsequently remove them in fully sealed condition. Thus, the steps as are involved in the cap sealing operation are performed continuously so that further operations on the package are unnecessary.

Moreover, in its broad aspects, the present invention is intended to be adaptable for application in cap sealing machines which are loaded and discharged by either fully or partially automatic operation, or by essentially manual operation. Of course, in its preferred embodiment, the actual cap sealing operation in any such machine is intended to itself be automatic, although it is conceivable that such sealing steps of the novel method might also be performed by hand.

Briefly and generally describing the invention in its preferred embodiment, an annular shaped polystyrene cap having a downwardly turned rim portion is placed on a frustro-conical shaped waxed-paper receptacle which has an annular beaded rim, the downwardly turned rim portion of the cap resting adjacent the bead of the receptacle. The receptacle with its cap thus in place is positioned for rotation in the rim crimping and sealing apparatus of the invention with its protruding rim area contacting the novel hot and cold die segments which form the lower jaw of the apparatus. Though separated slightly at their cofacing respective ends, the hot die segment and the cold die segment are arranged in tandem, and together form a circular arc of about 180 degrees in length so that only a segmental portion of the rim area of the capped receptacle would be in contact therewith. Accordingly, a freely rotatable table is employed as a stand for the capped receptacle, maintaining its proper alignment while in engagement with the sealing jaws of the apparatus. Rotation of the capped receptacle is induced by a rotating upper jaw, presenting a friction surface or the like, which is brought to bear against the cap, thus imparting crimping pressure on the cap as well as rotation to the cap and receptacle assembly. The direction of rotation of the upper jaw is from the hot die segment towards the cold die segment. By reason of the arrangement and construction of the fixed, lower jaw die segments and the sandwiching of the receptacle bead and cap rim portion between the lower jaw and the rotating upper jaw, a highly satisfactory and substantially leak-proof mechanical sealing of the cap to the receptacle is effected.

The working surfaces of each of the hot and cold die segments of the lower jaw may be generally described as L shaped in cross-section, the projecting lower leg of the L providing the surface on which the protruding rim area of the capped receptacle rests. Such surface of each segment is substantially flat, a downwardly tapered surface portion being provided at the "lead-in" end thereof. A right-cylindrical surface facing towards the axis of rotation of the capped receptacle is developed by the vertical leg of the L, and the juncture between these two interiorly oriented surfaces generated by the L-shape is fillet-rounded. The vertically disposed working surface will, of course, support the annular periphery of the cap during the rim crimping operation.

The vertical spacing between the horizontally disposed working surface of the hot die segment and the horizontally disposed surface provided by the rotating upper jaw when in its position of crimping engagement is somewhat less than the initial, vertical height of the referred to cap rim portion so that a partial crimp in the cap rim portion is formed between these surfaces, sufficient merely to tuck the cap rim portion beneath the bead of the receptacle, promptly upon the lowering and bringing to bear of the rotating upper jaw. However, the cold die segment is mounted slightly higher than the hot die segment so that, in the preferred embodiment, its horizontally disposed surface is about thirty-thousandths of an inch (.030") closer to the rotating surface provided by the upper jaw. Thus, the rim portion of the cap will be additionally crimped, and the bead of the receptacle crushed to this extent as the assembly moves past the cold die segment.

The temperature of the hot die segment is maintained sufficiently high so as to condition the material of the cap rim portion for permanent deformation. In a manually loaded, single station sealing machine, the hot die segment is thermostatically maintained at about 300° F., and the cold die segment need merely be maintained at room temperature. However, the cold die segment may be maintained at a lower temperature, or its heat dissipating capacity may be increased, by installing cooling coils or the like therein, whereupon the crimping and sealing operation may be performed at higher speeds of rotation of the upper jaw, and in automatically loaded and multi-station machines. In the higher speed machines, the hot die segment is maintained at about 450°–500° F.

Thus, in the novel method provided by the preferred embodiment of the invention, the protruding rim area of a cap and receptacle assembly is conditioned for subsequent deformation and reset as it first moves across a hot die segment, whereupon a final crimp and a permanent resetting of the materials occurs as the beaded rim area thereafter moves across a cold die segment.

The method and apparatus of the invention is adapted for high speed operation, in the preferred embodiment the speed of rotation of the upper jaw being about 85 revolutions per minute (r.p.m.). It has been found that a completely satisfactory seal is effected where the apparatus is adapted to provide two, 360-degree revolutions of the capped receptacle while engaged by the crimping jaws.

These and other objects, features and advantages of the invention will become more fully apparent from the following detailed description thereof wherein a reference will be made to the accompanying drawings in which:

FIGURE 1 is a side elevation of a cap sealing machine embodying the invention;

FIGURE 2 is a front elevation of the machine of FIGURE 1;

FIGURE 4 is a similarly enlarged top plan view of only the hot and cold die elements as are incorporated in the machine of FIGURE 1; while FIGURES 4a and 4b are perspective views, similarly enlarged, of only the lead-in ends of the cold and hot die elements, respectively, as indicated in FIGURE 4;

FIGURE 5 is a front elevation of the FIGURE 4 showing;

FIGURE 7 is a sectional elevation of the plug-wedge type upper jaw element shown in FIGURE 6, the view being taken at lines 7—7 of FIGURE 6; while

Figure 7:
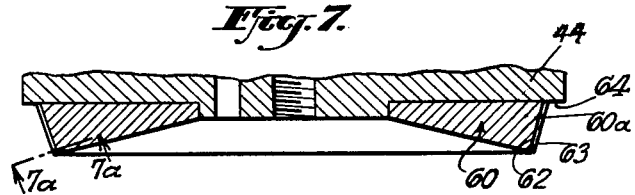
Figure 8:
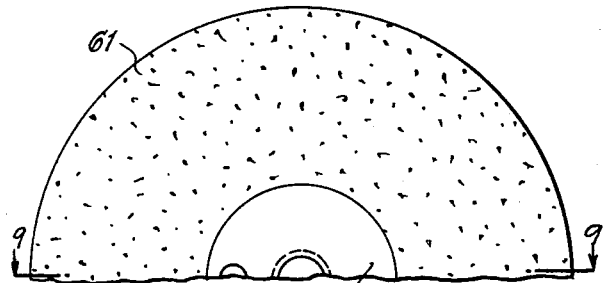
FIGURE 8 is a view, similar to FIGURE 6, showing a disc type upper jaw element as may be used as a substitute for the plug-wedge type element shown in FIGURE 6.
Figure 9:
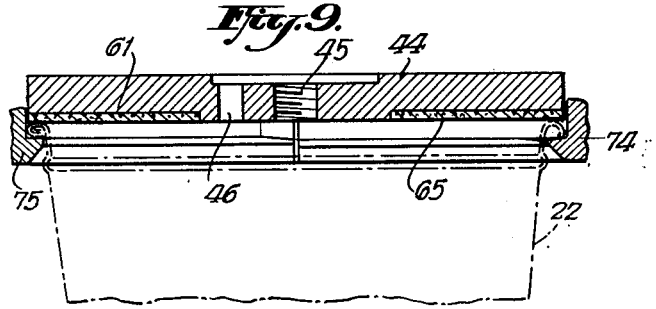
Figure 10:
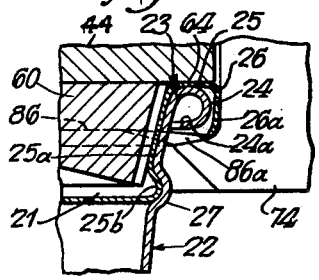
Figure 11:
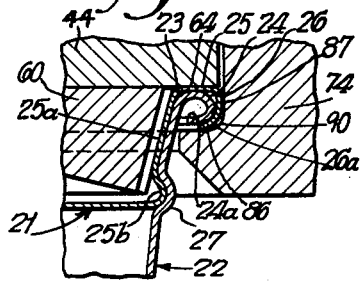
Figure 12:
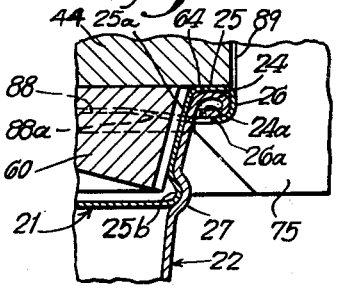
Figure 13:
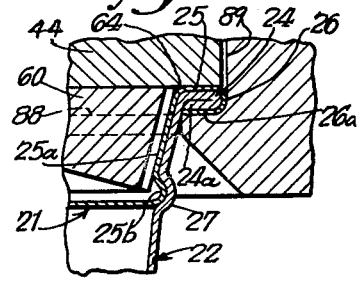

FIGURE 9 is a view, somewhat similar to FIGURE 7, but taken as indicated at lines 9—9 of FIGURE 8 and showing sufficient additional details to indicate the manner of operation of the disc type upper jaw element of FIGURE 8; and FIGURES 10 and 11 are enlarged sectional details of the machine of FIGURE 1 to show the progress of a receptacle and its cap past the hot die element thereof; while FIGURES 12 and 13 are similar showings of the subsequent progress of the same receptacle and its cap past the cold die element of the machine.

A preferred form of the invention is embodied in the cap sealing machine as is generally indicated by reference numeral 20. The illustrated machine is of a manual feed type, although it will be understood that the features thereof which comprise the present invention may be incorporated into automatically fed cap sealing machines such as might be, for example, of a turret type which is also capable of ejecting the containers as they are sealed in a continuous process.

Figure 3:
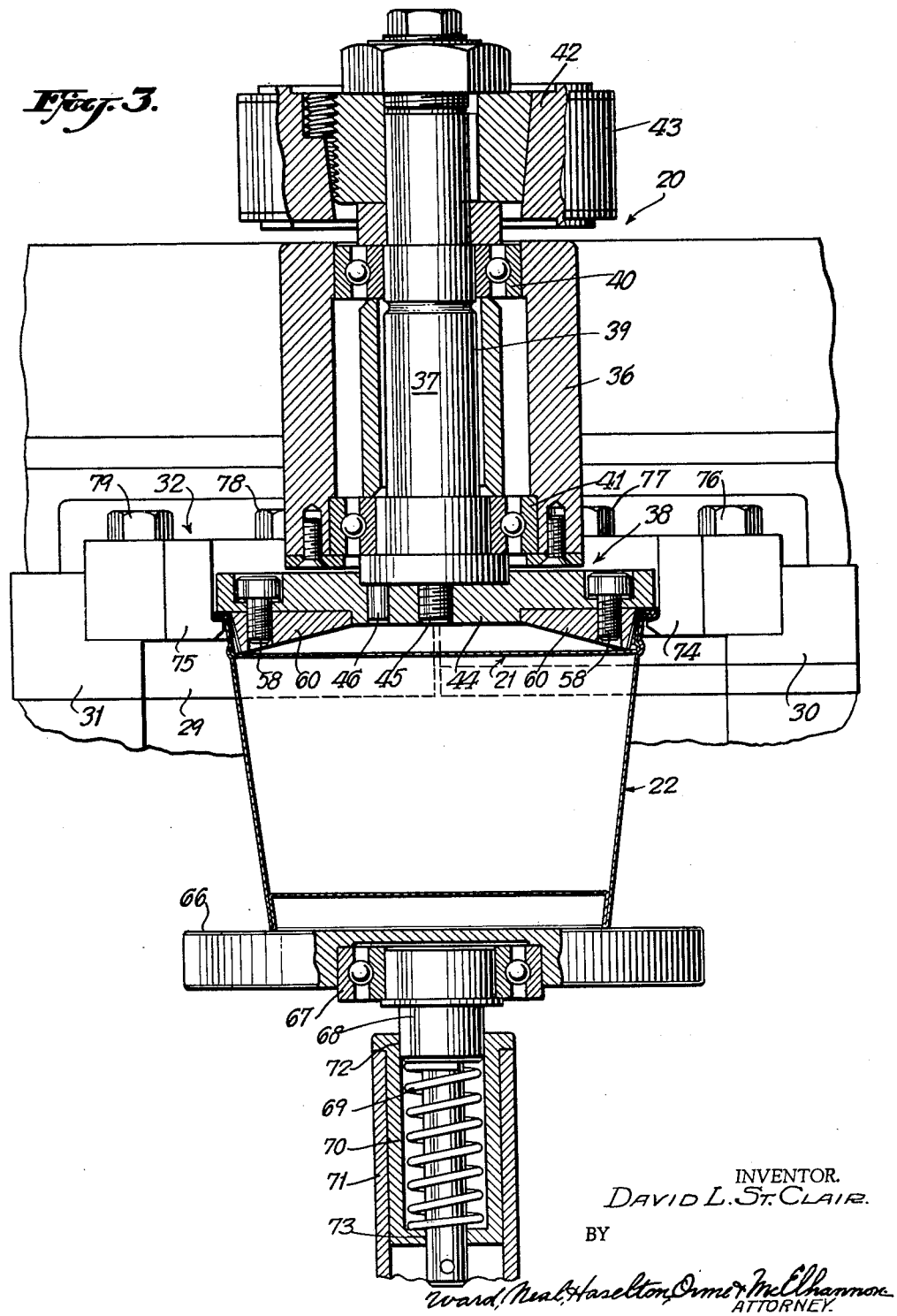
FIGURE 3 is an enlarged sectional view of the front end elements of the machine of FIGURE 1, the section being taken as generally indicated at lines 3—3 of FIGURE 1, to show certain additional details of the machine as well as the positioning of a receptacle and its cap therein for sealing.

Referring briefly to FIGURE 3 and more particularly to FIGURE 10, it will be understood that the machine 20 is intended for use in sealing a cap, as generally indicated by reference numeral 21, after the cap has been positioned in its conventional capping position closing the upper open end 23 of the receptacle 22. While, as previously indicated, the cap and receptacle may be made from other materials, the illustrated cap 21 may be considered as made of polystyrene, and the illustrated receptacle 22 may be considered as made of wax-coated stiff paper material. Further, it will be understood that the receptacle 22 has a conventional type beaded rim 24, which is substantially tubular in cross-section and which protrudes annularly about the periphery of the receptacle 22 adjacent its open end 23, and that the top 25 of the cap 21 has a peripherally disposed and downwardly turned rim portion 26. When the cap is so positioned on the receptacle, the downwardly turned rim portion 26 lies adjacent to, and surrounds the periphery of the beaded rim 24 of the receptacle, as indicated in FIGURE 10. The depending open end 26a of the downwardly turned cap rim portion 26 extends substantially to the level of the underside 24a of the receptacle beaded rim 24.

While the cap 21 is illustrated as being of a hollowed type as is provided by the annular shaped depressed portion 25a of its top 25, and while the cap 21 is further illustrated as having a peripheral bead 25b of its depressed portion 25a which seats within the hollow formed by the interior of another peripheral bead 27 of the receptacle, it should be understood that the top 25 of the cap may also be substantially flat, and that the additional receptacle bead 27 does not presently appear to be essential to the practice of the invention. Moreover, while the receptacle 22 is shown as having frustro-conical shape, it will be understood that it may also be cylindrical, or have other desired shape.

Referring again to FIGURES 1 and 2, the cap sealing machine 20 has a frame 28 which provides a mounting platform 29, at convenient working elevation, for the die holders 30 and 31 of the fixed lower jaw of the clamping type sealing apparatus of the machine as will be hereinafter described. The fixed lower jaw is generally indicated by reference numeral 32. The machine frame 28 also provides a bearing recess 33 for receiving the transverse shaft 34 which mounts the pivotal arm 35 of the machine. Stops (not shown) limit the pivotal movement of the arm 35 between its position as shown in full lines and its position as shown by dotted lines 35a in FIGURE 1.

At the front end of the arm 35 there is a housing 36 which, as will be understood from FIGURE 3, supports a rotatable mechanism, generally indicated by numeral 37, which mounts the upper jaw of the clamping type sealing apparatus. The thus rotatably mounted upper jaw is generally indicated by reference numeral 38. The rotatable mechanism 37 comprises a vertically extending shaft 39 mounted between bearings 40 and 41 of the housing 36. On its upper end, where it projects out of the housing 36, the shaft 39 has an attached pulley 42 which is driven by a belt 43 for imparting counterclockwise rotation to the shaft 39, as viewed from above the machine, so that the upper jaw 38 will rotate in the direction of arrow A as seen in FIGURES 1 and 2. Considered to be a part of the upper jaw 38, a rotary head 44 is attached, as by threaded screw connection 45 and the locking pin 46, to the lower end of the shaft 39.

The drive belt 43 is driven by the drive pulley 47 which is mounted at the rearward end of the pivotal arm 35, as seen in FIGURE 1. The drive pulley 47 is on a vertical drive shaft 48 which is driven, through connections (not shown) within the speed reducer 49, by motor 51. The motor 51 and speed reducer 49 are mounted on the depending L-shaped frame extension 59 of the arm 35, and the motor drives a drive sheave 52 which is connected by pulley 53 to the sheave 50 at the speed reducer. By various drive connections (not shown), involving connections made within the speed reducer 49, the externally mounted pinion gear 54, the bull gear 55 which is attached to a rotatable shaft 56, which is, in turn, mounted on the tiltable frame extension 59, and a cam element 57 which is also attached to the shaft 56, it will be understood that, in the preferred embodiment of the invention, the pulley 42 is rotated at about 86 r.p.m., and that by the cam element 57 the pivotal arm 35 is caused to remain in its lowered position (as illustrated by full lines in FIGURE 1) only for the time during which the pulley 42 makes at least one, and preferably two complete revolutions, whereupon the arm 35 automatically pivots upwardly to its position as indicated by dotted lines 35a in FIGURE 1. The several particular connections and mechanisms which afford such operation of the pivotal arm 35 and the driving of drive pulley 47 are not claimed as comprising essential elements of the present invention, and therefore need not be described in greater detail.

Figure 6:
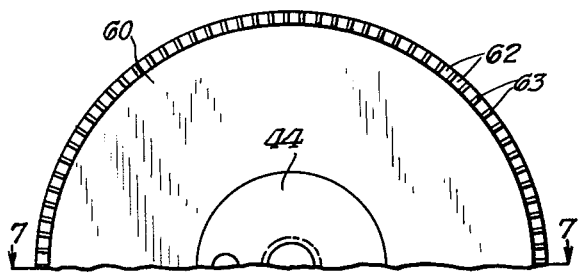
FIGURE 6 is an enlarged bottom plan view of a plug-wedge type upper jaw element of the machine of FIGURE 1, the view being taken as indicated by lines 6—6 in FIGURE 2.
Figure 7A:
FIGURE 7a is a further enlarged sectional view, as seen at lines 7a—7a of FIGURE 7, showing the details of the grip wedges and flutes which are disposed about the periphery of such element.

Referring now to FIGURE 3, to the rotary head 44 there is attached, as by screws 58, a plug-wedge type gripping element 60 which is illustrated in greater detail in FIGURES 6, 7 and 7a. Alternatively, and as illustrated in FIGURES 8 and 9, a disc type gripping element 61 may be attached, as by a press fit connection as indicated in FIGURE 9, to the rotary head 44. Thus, the upper jaw 38 may be considered as comprising the rotary head 44 and a gripping element, such as either element 60 or 61.

Because either type of gripping element 60 or 61 is intended to grip the cap 21 for imparting rotation to the cap and receptacle assembly, in manner as will be hereinafter described, each of these gripping element forms is adapted for the purpose. As illustrated in FIGURE 6 and in even greater detail in FIGURE 7a, the plug-wedge type gripping element 60 is provided with a peripheral series of flutes 62 which define peripherally projecting grip wedges 63 whose vertically inclined edges taper with respect to each other in conformance with the taper of the downwardly projecting tapered periphery 60a of the element 60. The tapered periphery 60a conforms with the interiorly disposed tapered periphery of the cap 21, as is presented by the annular depressed portion 25a of its top 25, so that frictional gripping engagement with be effected between the upper jaw 38 and the cap 21 during the crimping and sealing operation. As seen from the drawings, the diameter of the rotary head 44 substantially corresponds with the outer diameter of cap 21, and is larger than that of the gripping element 60, so that a flat, downwardly facing surface 64 of the upper jaw 38 is provided by the difference between the two diameters. As will be later more fully understood, the downwardly facing surface 64 is primarily intended to exert crimping pressure on the top 25 of the cap 21 during the sealing operation, and the gripping element 60 is adapted to grip the annular depressed portion 25a of the cap where a hollowed type cap 21, as illustrated, is used. It becomes apparent that where a flat type cap (not illustrated) is to be applied to the receptacle 22, a downwardly extending grip surface, such as is presented by the tapered periphery 60a, cannot be effectively incorporated in the upper jaw configuration. Accordingly, the alternative form of gripping element 61 is of a disc type adapted to frictionally grip the top of such flat type cap, if used. It has been found that the disc type gripping element 61 is very effectively made of sintered carbide, its downwardly facing surface 65 providing adequate frictional engagement with the top of the cap so as to grip the cap with sufficient force to impart the necessary rotation thereto, as aforesaid, during the sealing operation. Moreover, it has been found that a disc type gripping element 61 of sintered carbide material is equally effective for use with hollowed type caps, as illustrated in the drawings.

Returning now to FIGURES 1–3, a freely rotatable table 66 is used to support the receptacle 22 during the sealing operation. As shown in FIGURE 3, the table 66 is rotatably mounted on a ball bearing 67 which is attached to the vertically extending and resiliently mounted shaft 68. Resilient mounting of the shaft 68 is effected by the spring 69 which surrounds the shaft within the bearing sleeve 70. The sleeve 70 is press fit within a tubular support 71 which, in turn, is attached in fixed position on the machine frame 28, and the shaft 68 is freely rotatable between its two bearing points within the sleeve 70, as are indicated by reference numerals 72 and 73. The spring 69 exerts its bias pressure in upward direction and tends to compress the receptacle and cap assembly between the table 66, on which the receptacle rests, and the upper jaw 38, which is in engagement with the cap 21, during the sealing operation.

Referring now to the particulars of the lower jaw 32, it should first be noted that the upper and lower jaws of the apparatus, when in closed position as illustrated, present surfaces which together form a crimping die through which the protruding beaded area of the cap and receptacle will pass during the operation. A clamping action on such beaded area will be provided by adaption of the engagement surfaces presented by the upper and lower jaws, with respect to each other, as well as by the pressure resulting from the downward movement of upper jaw 38 to its closed position. Since the pressure engagement surface 64 of the upper jaw 38 is rotating in a horizontal plane as previously indicated, total effective clamping or crimping pressure is provided by adaption of the engagement surface which is presented by the fixed lower jaw 32.

The lower jaw 32 comprises the die holders 30 and 31, as previously noted; a hot die segment 74 which is mounted on die holder 30, such as by bolts 76, 77; and a cold die segment 75 which is mounted on die holder 31, such as by bolts 78, 79. Referring briefly to FIGURES 4 and 5, it will be understood that the die holder 30 is attached to the mounting platform 29 as by bolts 80 and 81, and that the die holder 31 is attached to the mounting platform 29 as by bolts 82 and 83.

The die holder 30 is of stainless steel material, and is heated to a temperature, as aforesaid, by means of heating coils therein, as generally indicated by numeral 84, and it will be understood that the die holder 30 conducts such heat to the hot die segment 74. The temperature is controlled by a thermostat 84a. The die holder 31 is of aluminum material, and may be at room temperature in certain applications of the apparatus, as previously noted. However, as indicated by cooling coils 85 which are disposed within the die holder 31 and through which a coolant, such as water, may flow as indicated by the arrows, this die holder, and consequently the cold die segment 75, may be made appreciably colder than room temperature for higher speeds of operation, or simply to increase its heat dissipating capacity as may sometimes be desirable, for example, where environmental temperature is unusually high.

Referring particularly to FIGURES 4a, 4b and 5, it is seen that the working surfaces of both die segments 74, 75 appear to be generally similar, each being substantially L-shaped in cross-section at its working surfaces. On a radius of curvature corresponding to that of the periphery of the cap rim portion 26, an interiorly facing, right-cylindrical surface is generated by the vertical leg of the L-shape in each instance, thus providing a peripheral supporting surface 87 of the hot die segment 74 and a similar surface 89 of the cold die segment 75. The horizontal leg of the L-shape in each instance generates an upwardly facing, flat surface against which the protruding beaded areas of the cap and receptacle are supported during the sealing operation. These surfaces are indicated by reference numerals 86, with respect to the hot die segment 74, and 88, with respect to the cold die segment 75. For facilitating the folding of the depending open end 26a of cap rim portion 26 under the underside 24a of the receptacle bead 24, the respective lines of juncture between peripheral supporting surfaces 87, 89 and the upwardly facing flat surfaces 86, 88 are filet-rounded as indicated at numerals 90 and 91, respectively. It has been found that highly satisfactory crimping is achieved where the radius of the hot die segment filet 90 is from .050 to .060 inch, and the radius of the cold die segment filet 91 is from .030 to .040 inch. Tapered lead-in surfaces are provided on each of the segments 74, 75 to facilitate the operation. These are clearly illustrated in FIGURES 4a and 4b. The vertically cylindrical surface 87 of the hot die segment 74 has a tapered lead-in surface 87a, the angle of the taper being from about 15- to 45-degrees. A tapered lead-in surface 86a, of about 15-degrees, is provided on the flat surface 86 of the same die segment. Referring to the cold die segment 75, the similar respective lead-in surfaces 89a, 88a are each tapered at a relative angle of 8-degrees. In addition, although not shown, the otherwise sharp, extreme lead-in edges may be chamfered or rounded if necessary for perfectly smooth operation.

Referring first to FIGURE 4, it will be noted that the hot and cold die segments 74, 75 are arranged in tandem, and will together support only a segmental portion of the protruding beaded periphery of the cap and receptacle. In the illustrated embodiment, the respective engagement lengths of the die segments 74, 75 are equal, and their cumulative total length extends substantially 180-degrees about such beaded periphery. However, it is contemplated that in different applications the respective lengths of the die segments may preferably be unequal, depending upon the relevant temperatures, the types of cap and receptacle materials, and other factors, and further that the total length of the segments might extend considerably less than 180-degrees about such beaded periphery. Indeed, in one experiment, a total arc length of only about 60-degrees was found satisfactory. It should also be noted that spacing 100 is provided between the respectively co-facing ends of the dies and die holders to prevent contact and the consequent flow of heat therebetween. Thus, the temperatures of the respective dies may be more adequately individually controlled.

Referring now to FIGURE 5, it is seen that the level of the flat surface 88 of the cold die segment 75 is somewhat higher, about from .030 to .060 inch, than that of the flat surface 86 of the hot die segment 74. If the hot and cold die segments are manufactured to the same overall height, a shim (not shown) may be inserted under the cold die segment for the purpose. Considering that, in its operating position, the downwardly facing surface 64 of the upper jaw 38 will be rotating in a horizontal plane, it will be understood that it is intended that additional crimping, or folding and squeezing together of the protruding beaded peripheral areas of the cap and receptacle will occur as the beaded segment being crimped passes from the hot die segment to the cold die segment, it being recalled that the upper jaw 38, and consequently the cap and receptacle will be rotating in the direction of arrow A, FIGURES 1 and 2.

The operation of the novel cap sealing apparatus is illustrated, and will be more fully understood from FIGURES 10–13.

A receptacle 22, with its cap 21 in its capping position thereon, is placed on the rotatable table 66 (FIGURE 3) with the protruding beaded periphery of the assembly, as is formed by the annularly protruding top 25 and downwardly turned rim portion 26 of the cap as they substantially envelop the peripherally protruding beaded rim 24 of the receptacle, placed against the conforming, interiorly facing cylindrical surfaces 87 and 89, of the hot and cold die segments, respectively.

With respect to the adequacy or degree of preassembly of the cap and receptacle, it has been found that the cap 21 need not necessarily be firmly and fully positioned on the open end 23 of the receptacle as illustrated, but that it is sufficient if the cap be positioned with its downwardly turned rim portion 26 simply peripherally adjacent the receptacle beaded rim 24. The movement of the upper jaw 38 to its jaw-closing position appears to properly seat the cap as the sealing operation begins.

It should also be noted that, when the cap and receptacle assembly is so positioned on table 66, its protruding beaded area may be, and preferably is, also substantially in contact with, or at least closely adjacent to the flat surfaces 86 and 88 of the hot and cold die segments, respectively, the bias of the table spring 69 (FIGURE 3) being only sufficient to raise the table 66 a distance as will assure passage of the underside of such beaded periphery across these flat surfaces of the die segments as the beaded periphery is moved against the interiorly facing cylindrical surface, as aforesaid.

With the cap and its receptacle so positioned, the sealing operation is initiated by closing the jaws of the die, this being accomplished in the embodiment shown by pivoting the arm 35 from its position 35a to its position as shown in full lines in the drawings. The rotatable mechanism 37 may be rotating at the time.

Considering that at least the material of which the cap rim portion 26 is made is of a type which is subject to pliable deformation when heated, the segmental length of the beaded periphery of the cap and receptacle which lies within the length of the hot die segment 74 will be heated, and thus preconditioned for accepting the permanent deformation thereof as is contemplated by the invention. Moreover, the vertical spacing, as shown in FIGURE 11, between surface 86 of the hot die segment 74 and the surface 64 of the rotary head 44, when the upper jaw 38 is in its fully closed position, is preferably made slightly less than the height of the cap rim portion 26. Thus, the depending open end 26a of the cap rim portion is initially tucked under the underside 24a of the receptacle beaded rim 24 as the rotary head surface 64 first makes contact with the top 25 of the cap, as seen in FIGURE 10, and moves to its fully closed position as shown by FIGURE 11. The lead-in surface 86a facilitates such tucking, considering that the cap and receptacle are beginning to rotate responsive to engagement by the upper jaw gripping element 60 as previously explained.

Such preconditioning is highly effective within the short segmental length of the hot die segment, as is contemplated by the preferred embodiment of the invention. Thus, when the preconditioned segmental length of the protruding beaded periphery of the cap and receptacle passes, by its rotative movement, to the cold die segment 75, the depending open end 26a of the cap may be tucked more fully beneath the underside 24a of the receptacle beaded rim 24, the progress of the segmental portion into the cold die segment 75 being illustrated by FIGURES 12 and 13.

The vertical spacing between the cold die segment surface 88 and the rotating surface 64 of the upper jaw 38 being less than the similar spacing within the hot die portion, as previously explained, the open end 26a is also firmly pressed upwardly against the underside 24a of the receptacle bead, the latter being fully crushed between the flat, protruding top 25 of the cap and such lower end of the rim portion 26, as shown in FIGURE 13. Such further folding of the rim portion and crushing of the recepatcle bead occurs almost immediately upon entry of the preconditioned segment into the cold die portion of the apparatus so that, during the remaining portion of its travel therethrough, the cap rim portion 26 is cooled sufficiently to accept a permanent set in such folded and pressed condition.

Though it is contemplated that at least some permanent deformation of the receptacle beaded rim 24 in its crushed position as illustrated in FIGURE 13 will occur due to the preconditioning of that element within the hot die portion, it will be understood that, absent such preconditioning of the receptacle beaded rim 26, the rim 26 will retain its resiliency and therefore perhaps contribute to the firm locking engagement of the cap rim portion end 26a thereunder by exerting bias pressure on the tucked end 26a, tending to increase the watertightness of the sealed container after the sealing operation has been completed.

The temporary crushing of the cap rim portion and receptacle bead as occurs initially over the length of the beaded periphery segment which is, at the outset of the operation, within the cold die portion appears not to affect the subsequent progress of such segment first through the hot die portion and thence again through the cold die portion of the apparatus. Similarly, the now fully sealed segmental length of the beaded periphery as is momentarily within the hot die portion at the time the jaws of the apparatus are subsequently opened to remove the sealed container appears not to lose its permanent set.

As previously mentioned, one complete revolution of the receptacle within the apparatus may be adequate to fully lock and seal the cap 21 on to the open end 23 of receptacle 22. However, one and a half turns has been found to be more effective, and two complete turns of the receptacle within the sealing apparatus has been found to be highly effective for assuring that an adequately leak proof seal has been formed. Accordingly, the latter number of turns is preferred.

When the thus described locking and sealing of the cap 21 on to receptacle 22 has been effected, the jaws of the die apparatus are opened by pivoting the arm 35 to its open position as shown by lines 35a, FIGURE 1.

As previously noted, the cam 57 and its associated follower mechanism (not numbered) may be included for automatically releasing and opening the upper and lower jaws upon two revolutions of the rotary head 44, and therefore of the receptacle and cap having occurred. In addition, a pressure switch (not shown) may be included at a location on the machine frame 28 adjacent the intended position of receptacle 22 for operating an electric clutch (not shown) to connect the gears 54, 55 to motor 51 for commencing the rotation of cam 57 which causes pivoting of arm 35 which, in turn, brings the upper jaw 38 to bear on cap 21 when the receptacle has been fully seated in its sealing position, thus to promptly initiate the operation. Moreover, such pressure switch may be adapted to remain depressed during two revolutions of the head, thereafter to spring forward and "kick out" the now sealed container. And, as previously noted, automatic capping, receptacle feeding, and container discharge handling apparatus (not shown) might be associated with the sealing apparatus as has been described, for fully automatic handling of the capping and sealing process. It is believed that the incorporation of such additional features or apparatus may be effected by those having skill in the art, whether or not the inclusion of the same amount to patentable invention, but that the present invention is best described without unduly burdening this specification with such additional matter.

Accordingly, the present invention is considered as comprising only the method and apparatus as falls within the scope of the appended claims.

What is claimed is:

1. Apparatus for sealing a cap on to a receptacle or the like, comprising upper jaw means and cooperating lower jaw means adapted with respect to each other to receive therebetween and mutually engage a protruding portion of the conjoining peripheral edges of the cap and receptacle when the cap is substantially in capped position on the receptacle, means for opening and closing said upper and lower jaw means with respect to each other, said lower jaw means comprising a heated portion adapted to heat a length of such received cap and receptacle protruding edge portion when said upper and lower jaw means are in closed position, said lower jaw means further comprising a cool portion in substantially coplanar tandem relation with its said heated portion, at least said cool portion of said lower jaw means being adapted with respect to said upper jaw means, when the jaws are in such closed position, to apply crimping pressure to said length of the cap and receptacle protruding edge portion when subsequently received therebetween, and means for moving said length of the cap and receptacle protruding edge portion from said heated portion of the lower jaw means to said cool portion of the lower jaw means when said upper and lower jaw means are in closed position.

2. Apparatus for mechanically sealing a cap having a downwardly turned rim portion to a receptacle or the like having a protruding beaded rim substantially adjacent an open end thereof on which such cap has been positioned with its said rim portion adjacent said beaded rim of the receptacle, said apparatus comprising upper jaw means and lower jaw means adapted for positioning at a jaw-opened position and at a jaw-closed position with respect to each other, said upper jaw means being adapted for engaging the top of such cap when said upper and lower jaw means are in said jaw-closed position, said lower jaw means comprising a heated die element and a cold die element disposed in substantially coplanar tandem relation with said heated die element and adapted for engaging such downwardly turned rim portion of the cap when said jaw means are in said jaw-closed position, and means for moving said downwardly turned cap rim portion and receptacle beaded rim, when so engaged by said lower jaw means, in direction from said heated die element towards said cold die element, said upper and lower jaw means when in said jaw-closed position being adapted with respect to each other for progressively folding and pressing at least the depending open end of said downwardly turned cap rim portion against the underside of said protruding beaded rim of the receptacle in response to such movement thereof.

3. Apparatus for mechanically sealing a circular cap having a downwardly turned rim portion to a receptacle or the like having an annular protruding beaded rim substantially adjacent an open end thereof on which such cap has been positioned with its said rim portion adjacent said beaded rim of the receptacle, said apparatus comprising a rotatable upper jaw and a fixed lower jaw, said upper jaw being substantially vertically positionable from a position thereof with respect to said lower jaw which defines a jaw-opened position of the jaws to a second position thereof proximate said lower jaw which defines a jaw-closed position of the jaws, said upper jaw being adapted for gripping such cap and imparting rotation to such cap and receptacle responsive to rotation of said upper jaw when in its said second position, said lower jaw comprising a hot die segment and a cold die segment in substantially coplanar tandem relation with said hot die segment, said hot and cold die segments being adapted to receive, and to extend about only a segmental length of such downwardly turned cap rim portion, at least said cold die segment being further adapted with respect to said upper jaw to fold the depending open end of said cap rim portion under, and effectively press the same against the underside of said receptacle beaded rim when said jaws are in said jaw-closed position, the dirction of such rotation of said upper jaw being from said hot die segment towards said cold die segment.

4. Apparatus according to claim 3 wherein said hot and cold die segments of the lower jaw are adapted to extend in length substantially one hundred and eighty degrees (180°) with respect to the annular length of said downwardly turned cap rim portion.

5. Apparatus according to claim 3 wherein each of said hot and cold die segments comprises an upwardly facing and outwardly projecting substantially flat surface adapted to engage the depending open end of said cap rim portion, said surface of the cold die segment being disposed at a vertical elevation which is closer to said upper jaw than the vertical elevation of said surface of the hot die segment with respect to said upper jaw when said jaws are in their said jaw-closed position.

6. Apparatus according to claim 5 wherein said surface of the cold die segment includes a downwardly tapered portion to said elevation of said surface of the hot die segment, said tapered portion being disposed to provide an incline between said elevations at that end of said cold die segment which is in tandem adjacency with respect to said hot die segment.

7. Apparatus according to claim 6 wherein each of said hot and cold die segments further comprises a right-cylindrical surface disposed vertically with respect to said substantially flat surface of each of said hot and cold die segments, respectively, each of said flat surfaces projecting outwardly of the said right-cylindrical surface of its respective die segment, the line of juncture between each of said respective right-cylindrical and substantially flat surfaces being filet-rounded.

8. Apparatus according to claim 3 wherein said upper jaw comprises a rotatable head portion and a gripping portion depending therefrom, said upper jaw being circular in plan view, and said gripping portion having annular shape of diameter less than that of said rotatable head portion, whereby a peripherally extending and downwardly facing surface is presented by said rotatable head portion for cooperating with said lower jaw during such sealing of the cap to the receptacle.

9. Apparatus according to claim 8 wherein the depending periphery of said gripping portion tapers inwardly towards the center of rotation of said upper jaw, the surface presented by said tapered periphery having alternating and substantially vertically disposed fluted portions and grip wedge portions.

10. Apparatus according to claim 3 wherein said upper jaw comprises a flat disc having a downwardly facing surface adapted to frictionally engage the top of said cap.

11. Apparatus for sealing a cap having a downwardly turned rim portion to a receptacle or the like having a protruding rim substantially adjacent an open end thereof on which such cap has been positioned with its said rim portion adjacent said rim of the receptacle, said apparatus comprising hot die means including cofacing upper and lower jaw means in spaced apart relation with respect to each other for receiving therebetween and respectively engaging an upper peripheral portion of said cap and said downwardly turned rim portion of the cap, at least said hot die lower jaw means having means for heating the same, cold die means including cofacing upper and lower jaw means disposed in substantially coplanar tandem relation with the respective of said hot die upper and lower jaw means, said cold die means further including means for folding said downwardly turned rim portion of the cap under said protruding rim of the receptacle, said cold die upper and lower jaw means being in spaced relation with respect to each other for receiving therebetween and respectively engaging said upper peripheral portion and said downwardly turned rim portion of said cap, the spacing between said cold die upper and lower jaw means being such as to press said downwardly turned rim portion of the cap, when so folded, against the underside of said receptacle rim, and means for engaging said cap and receptacle to concurrently move their said respective rim portions in continuous movement from said hot die means to said cold die means.

References Cited in the file of this patent
UNITED STATES PATENTS

| | | |
|---|---|---|
| 850,288 | Beyer | Apr. 16, 1907 |
| 1,137,820 | Westlake | May 4, 1915 |
| 1,846,670 | Barbieri | Feb. 23, 1932 |
| 2,110,898 | West | Mar. 15, 1938 |
| 2,218,585 | Merkle | Oct. 22, 1940 |
| 2,455,461 | Anderson | Dec. 7, 1948 |
| 2,597,830 | Webb | May 20, 1952 |
| 2,752,744 | Pechy | July 3, 1956 |
| 2,875,563 | Moore | Mar. 3, 1959 |
| 2,991,602 | Van de Kerke et al. | July 11, 1961 |